US012467395B2

(12) United States Patent
Fitch et al.

(10) Patent No.: US 12,467,395 B2
(45) Date of Patent: Nov. 11, 2025

(54) ONBOARD DEVICE AND METHOD FOR CHECKING DIESEL EXHAUST FLUID QUALITY

(71) Applicant: Perkins Engines Company Limited, Peterborough (GB)

(72) Inventors: Daniel Fitch, Enfield (GB); Mark Philip Aldred, Market Deeping (GB); Ivan Rogers, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 84 days.

(21) Appl. No.: 17/892,497

(22) Filed: Aug. 22, 2022

(65) Prior Publication Data

US 2023/0053630 A1 Feb. 23, 2023

(30) Foreign Application Priority Data

Aug. 20, 2021 (GB) .................................. 2111959

(51) Int. Cl.
*F01N 3/20* (2006.01)

(52) U.S. Cl.
CPC .......... *F01N 3/208* (2013.01); *F01N 2610/10* (2013.01); *F01N 2610/1406* (2013.01); *F01N 2900/1806* (2013.01)

(58) Field of Classification Search
CPC ................ F01N 11/00; F01N 2610/10; F01N 2610/1406; F01N 2610/1413; F01N 2900/1806; F01N 2900/1818; F01N 3/208; Y02T 10/12
See application file for complete search history.

(56) References Cited

U.S. PATENT DOCUMENTS

| 8,505,283 | B2 | 8/2013 | Oda |
| 8,680,437 | B2 | 3/2014 | Starck |
| 9,261,491 | B2 | 2/2016 | Bang |
| 10,107,164 | B2 | 10/2018 | Dingle |
| 2013/0074590 | A1 | 3/2013 | Bertow |

(Continued)

FOREIGN PATENT DOCUMENTS

| DE | 102012215635 | * | 3/2014 |
| DE | 102015217613 | | 3/2017 |
| EP | 2893164 B1 | | 9/2019 |

(Continued)

OTHER PUBLICATIONS

Great Britain Search Report related to Application No. 2111959.9 reported on Jan. 24, 2022.

(Continued)

*Primary Examiner* — Phutthiwat Wongwian
*Assistant Examiner* — Diem T Tran

(57) ABSTRACT

The present invention pertains an onboard device for checking the quality of DEF in a work machine, comprising a flow channel configured to fluidly connect a DEF inlet with a DEF tank. The flow channel comprises a DQS configured to be brought into contact with DEF passing through the flow channel. The present invention also pertains to a method of checking the quality of DEF comprising the steps of tilling DEF into a flow channel configured to fluidly connect a DEF inlet with a DEF tank; and checking, by means of a DQS, the quality of the DEF in the flow channel.

16 Claims, 7 Drawing Sheets

(56) References Cited

U.S. PATENT DOCUMENTS

2015/0159531 A1    6/2015  Ryoo et al.
2016/0138452 A1*   5/2016  Dingle .................. F01N 11/00
                                                              60/299

FOREIGN PATENT DOCUMENTS

GB        2529163         2/2016
KR       20200009958   *  1/2020
WO      2020016157 A1    1/2020

OTHER PUBLICATIONS

European Extended Search Report for EP Application No. 22188469. 5, mailed Jan. 1, 2023 (7 pgs).

* cited by examiner

ONBOARD DEVICE AND METHOD FOR CHECKING DIESEL EXHAUST FLUID QUALITY

CROSS-REFERENCE TO RELATED APPLICATION

This application claims priority under 35 USC § 119 and the Paris Convention to Great Britain Patent Application No. 2111959.9 filed on Aug. 20, 2021.

TECHNICAL FIELD

The present invention pertains to an onboard device for checking the quality of DEF in a work machine, comprising a flow channel configured to fluidly connect DEF inlet with a DEF tank. The present invention also pertains to a method of checking the quality of DEF.

TECHNOLOGICAL BACKGROUND

Work machines comprising diesel engines usually comprise exhaust gas aftertreatment systems for $NO_x$ emission reduction. In such systems, a Diesel Exhaust Fluid "DEF" is admixed to exhaust, thereby forming ammonia $NH_3$. The exhaust and ammonia subsequently pass into a selective catalytic reduction "SCR" catalyst, where they react to form harmless nitrogen and water vapor.

DEF is a urea-based chemical reactant stored as an aqueous urea solution in a dedicated DEF tank on the inside of a work machine. During operation of the diesel engine, DEF is pumped out of the DEF tank and injected into a decomposition reactor stage of the exhaust system. Once the DEF tank is depleted, it must be refilled to ensure emission compliance during operation of the work machine.

Since DEF refills are often handled by the work machine holder, on-site and outside scheduled maintenance intervals, its quality needs to be checked by the system each time a refill event occurs. For that purpose, a dedicated DEF quality sensor "DQS" is provided in the DEF tank, signaling whether the product put in the DEF tank is fit for purpose.

The problem with mounting a DQS in the tank is that it is constantly immersed in DEF. The problem with this is that over time, DEF breaks down into ammonia in the tank which then permeates into the sensing element causing short-circuit failures. This failure mode is accelerated by time (time the sensor is immersed in DEF) and the local temperature in the tank.

The onboard device for checking the quality of DEF and the method of checking the quality of DEF solve one or more problems set forth above.

SUMMARY OF THE INVENTION

Starting from the prior art, it is an objective to provide a reliable yet simple, cost-effective onboard device for checking the quality of DEF.

This objective is solved by means of an onboard device for checking the quality of DEF with the features of claim 1 and a method of checking the quality of DEF according to claim 12. Preferred embodiments are set forth in the present specification, the Figures as well as the dependent claims.

Accordingly, an onboard device for checking the quality of DEF in a work machine is provided, comprising a flow channel configured to fluidly connect a DEF inlet with a DEF tank. The flow channel comprises a DQS configured to be brought into contact with DEF passing through the flow channel.

Furthermore, a method of checking the quality of DEF is provided, comprising the steps of filling DEF into a flow channel configured to fluidly connect a DEF inlet with a DEF tank and by the step of checking, by means of a DQS, the quality of the DEF in the flow channel.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
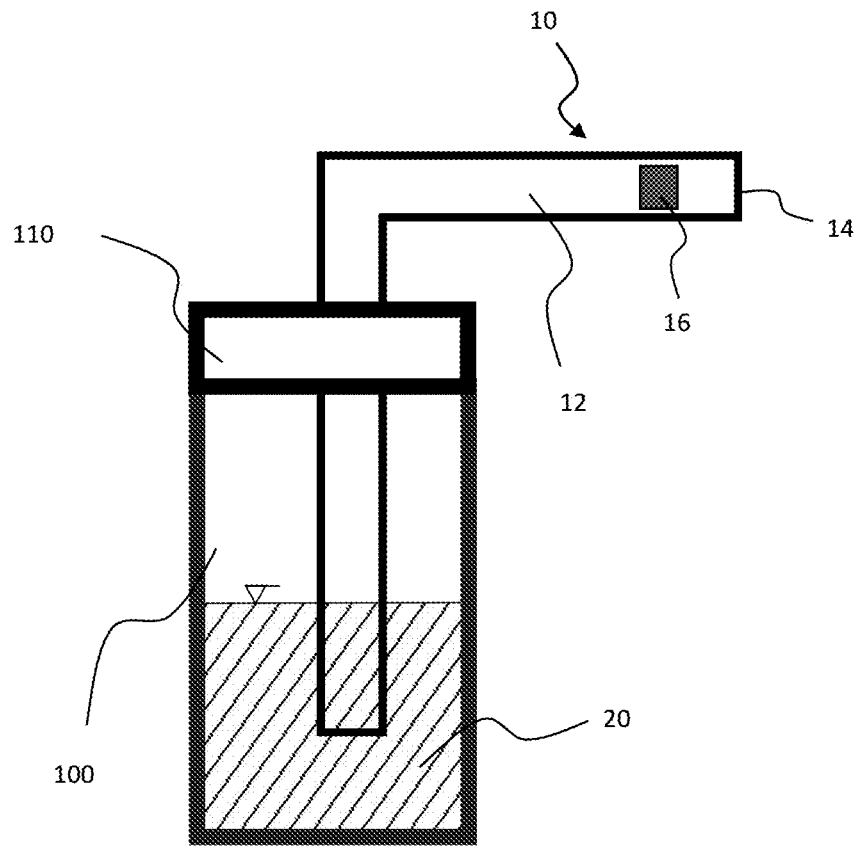
FIG. 1 schematically shows an onboard device for checking the quality of DEF according to an embodiment.

In the following, the invention will be explained in more detail with reference to the accompanying Figures. In the Figures, like elements are denoted by identical reference numerals and repeated description thereof may be omitted in order to avoid redundancies.

The main objective of a DEF quality check is to identify if a DEF product fit for purpose had been filled into the tank. The DQS only needs to perform a DEF quality check after DEF tank has been filled. In other words, only when a DEF refill event occurs, DEF quality needs to be checked.

At the location where DEF tanks are usually installed inside of a work machine, onboard temperatures can reach temperatures higher than 50° C. assuming nominal operation of the work machine and standard atmosphere ambient weather conditions.

Ammonia permeation and ammonia permeation-induced DQS failure occurs when the DQS is submerged in DEF for long residence times and/or at high temperatures.

The rate of ammonia formation is known to pose a high risk of submerged DQS malfunction at temperatures higher than about 50° C. The relative rate of ammonia formation is known to be about 6 times faster at 30° C., about 35 times faster at 40° C. and about 175 times faster at 50° C. compared to a reference ammonia formation at 20° C.

As ammonia formation increases, so does ammonia permeation into the DQS due to the increased concentration gradient between fluid and sensor. Consequently, the risk of ammonia permeation-induced sensor malfunction rises which is avoided by the onboard device according to the present disclosure.

Thereto, the present invention and its underlying principles are explained exemplary by several embodiments of onboard devices for checking the quality of DEF in a work machine.

In this context, the term "DEF" relates to aqueous urea solutions used in the process of selective catalytic reduction of $NO_x$ in diesel exhaust systems.

In FIG. 1, an onboard device 10 for checking the quality of DEF 20 according to an embodiment of the present disclosure is shown schematically. The onboard device 10 comprises a flow channel 12 configured to fluidly connect a DEF inlet 14 with a DEF tank 100.

The flow channel 12 comprises a DQS 16 configured to be brought into contact with DEF 20 passing through the flow channel 12. By that, both the amount of time the DQS 16 is submerged in DEF 20 and the local temperature can be reduced. Thereby, the likelihood of short-circuit failure of the DQS 16 is reduced.

The term "checking the quality of DEF 20" may relate to checking physical and/or chemical properties of the liquid filled into the tank and comparing the results against one or more predefined reference values. Further, "checking the quality of DEF 20" is achieved by the DQS 16. In other words, the DQS 16 according to the present disclosure is configured to check the quality of DEF 20.

Checking the quality of DEF 20 can be obtained by placing the DQS 16 in the flow channel 12 such that it will be brought into contact with DEF 20 filled into the flow channel 12 during a filling event. Thereby, the DEF 20 check can be taken during or after the tank filling process.

The term "brought into contact" may refer to wetting the DQS 16 for an amount of time sufficient for the sensor to conduct a reading.

Providing the DQS 16 in the flow channel 12 of the device 10 may thus refer to a scenario in which DEF 20 drains over the DQS 16 during a filling event. In this case, the DQS 16 is wetted by the DEF 20 while the DEF 20 flows over the DQS 16. This has the advantage that ammonia permeation induced DQS 16 failure can be avoided by the short amount of the time the DQS 16 is submerged in DEF. Another advantage is that ammonia permeation induced DQS 16 failure can be avoided by reducing the temperature of the DEF, as the DQS 16 may be provided at a location of lower temperatures.

Optionally, the onboard device 10 may further comprise a DEF tank 100 which may comprise a tank header 110.

Figure 2:
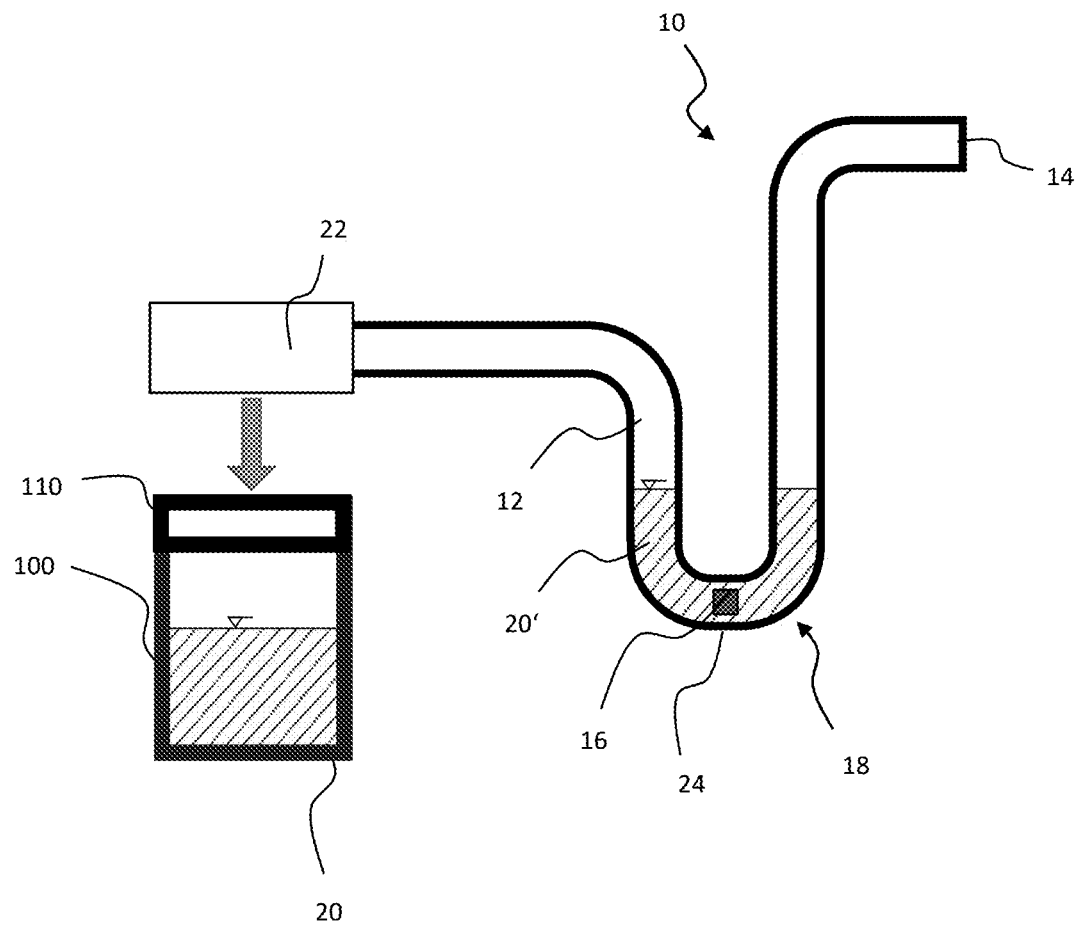
FIG. 2 schematically shows an onboard device for checking the quality of DEF according to a development of an embodiment.

FIG. 2 schematically shows an onboard device 10 for checking the quality of DEF 20 according to another embodiment of the present disclosure. According to this embodiment, the flow channel 12 of the onboard device 10 may further comprise a U-shaped section 18 configured to retain an amount 20' of DEF 20 passing through the flow channel 12. The DQS 16 may be configured such that it is submerged in the retained DEF amount 20' in a case when retained DEF amount 20' is present.

According to this embodiment, the DQS 16 may still be submerged in the retained amount 20' of DEF 20. However, according to this embodiment, the U-shaped section 18 and the DQS 16 may be placed at a location in the work machine where, during operation of the work machine, the local temperature is lower than a median temperature of the DEF tank 100 assuming normal operation of the work machine and standard atmosphere ambient weather conditions.

According to the present disclosure, the U-shaped section 18 may be oriented such that a bottom section 24 of the U-shaped section 18 is the lowermost point of the U-shaped section 18, such that liquid present in the U-shaped section 18 accumulates at the bottom section 24 due to gravitation. The accumulated amount of DEF in the U-shaped section 18 is hereinafter referenced as the retained amount 20' of DEF 20.

The retained amount 20' of DEF 20 retained in the U-shaped section 18 may be smaller than the total amount of DEF 20. Less DEF 20 leads to less ammonia formation. As a result, the ammonia concentration gradient is smaller and, following Fick's law of diffusion, the permeation of ammonia into the DQS 16 is smaller. Thereby, the likelihood of short-circuit failure of the DQS 16 is reduced.

A further advantage is that due to the stagnant reservoir of retained fluid 20' accumulated in the U-shaped section 18, the retained fluid 20' has a low degree of aeration, which can have a positive effect on the signal quality and accuracy of the output by the DQS 16. Thereby, the DEF quality check may be performed with higher accuracy.

Optionally, the onboard device 10 may comprise a pipe feed to tank device 22, via which DEF 20 may be drained from the flow channel 12 to the DEF tank 100. The DEF tank 100 may comprise a tank header 110. Further, the DQS 16 may be provided on the inside of the flow channel 12 and at the bottom section 24 of the U-shaped section 18.

Figure 3:
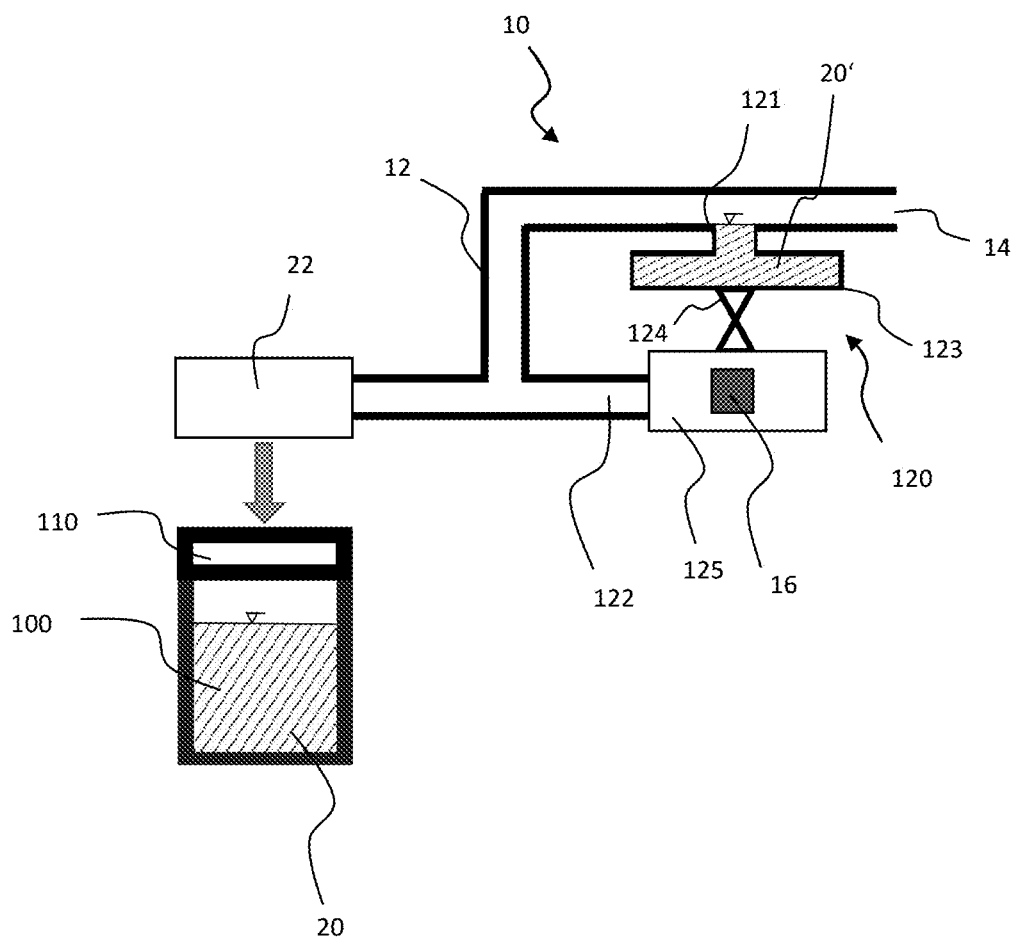
FIG. 3 schematically shows an onboard device for checking the quality of DEF according to another embodiment.

FIG. 3 schematically shows an onboard device 10 for checking the quality of DEF 20 according to another embodiment of the present disclosure. Like the embodiments shown in FIGS. 1 and 2, the onboard device 10 for checking the quality of DEF 20 in a work machine comprises a flow channel 12 configured to fluidly connect a DEF inlet 14 with a DEF tank 100. The flow channel 12 comprises a DQS 16 configured to be brought into contact with DEF 20 passing through the flow channel 12.

The flow channel 12 may comprise a flow channel bypass 120, wherein the DQS 16 may be provided in the flow channel bypass 120. By that, both the amount of time the DQS 16 is submerged in DEF 20 and the local temperature can be reduced. Thereby, the likelihood of short-circuit failure of the DQS 16 is reduced.

The flow channel bypass 120 may comprise a bypass reservoir 123, an upstream bypass section 121 and a downstream bypass section 122. The bypass may further comprise a bypass valve 124, wherein the bypass valve 124 may be provided downstream of the bypass reservoir 123. According to the embodiment shown in FIG. 3, the DQS 16 may be provided downstream of the bypass valve 124.

To this end, the flow channel bypass 120 may be configured such that when DEF 20 is passing through the flow channel 12, an amount of DEF 20 accumulates in the bypass reservoir 123 as retained DEF 20'.

The illustration provided in FIG. 3 may show a scenario where the DEF tank 100 had been refilled with DEF 20 via the inlet 14 of the flow channel 12. During the filling process, DEF 20 accumulated in the bypass reservoir 123 and the upstream bypass section 121. The accumulated amount of DEF in the bypass reservoir 123 is hereinafter referenced as the retained amount 20' of DEF 20.

Filling the DEF tank 100 with DEF 20 may have occurred while the work machine (not shown in FIG. 3) had been switched off (key-off). In the switched-off state, the DQS 16 may have been inactive. Hence, the DQS 16 was not available for checking the quality of DEF 20 inserted into the DEF tank 100 via the inlet 14 of the flow channel 12.

At the time the work machine is switched on (key-on), which is typically when the DEF sensor 16 must take a reading, the DQS 16 is available for checking the quality of the inserted DEF 20.

Providing a bypass reservoir 123, a bypass valve 124 downstream of the bypass reservoir 123 and the DQS 16 downstream of the bypass reservoir 123 has the advantage that the quality of the DEF 20 may be checked outside of the DEF tank 100 at a later point in time if the work machine is switched off during a filling event. To this end, the bypass valve 124 may be a valve of the standard-off type. Hence, if the work machine is switched off, the bypass valve 124 is in a closed position.

After the filling event, switching on the work machine will enable releasing the bypass valve 124 downstream of the bypass reservoir 123 which will drain the retained amount 20' of DEF 20 over the DQS 16 downstream of the bypass reservoir 123. During that time-span, the quality of the retained amount 20' of DEF 20 may be checked by the DQS 16. During all other times, the DQS 16 is not in contact with DEF 20. By that, both the amount of time the DQS 16 is submerged in DEF 20 and the local temperature can be reduced. Thereby, the likelihood of short-circuit failure of the DQS 16 is reduced.

Optionally, the onboard device 10 may comprise a pipe feed to tank device 22, via which DEF 20 may be drained from the flow channel 12 to the DEF tank 100. Further, the DQS 16 may be provided in a sensor overflow reservoir 125. The bypass valve 124 may be a two-way valve having an inlet and an outlet port for on/off actuation. Preferably, the bypass valve 124 may be a solenoid valve actuated by a control unit of the work machine (not shown in FIG. 3).

Figure 4:
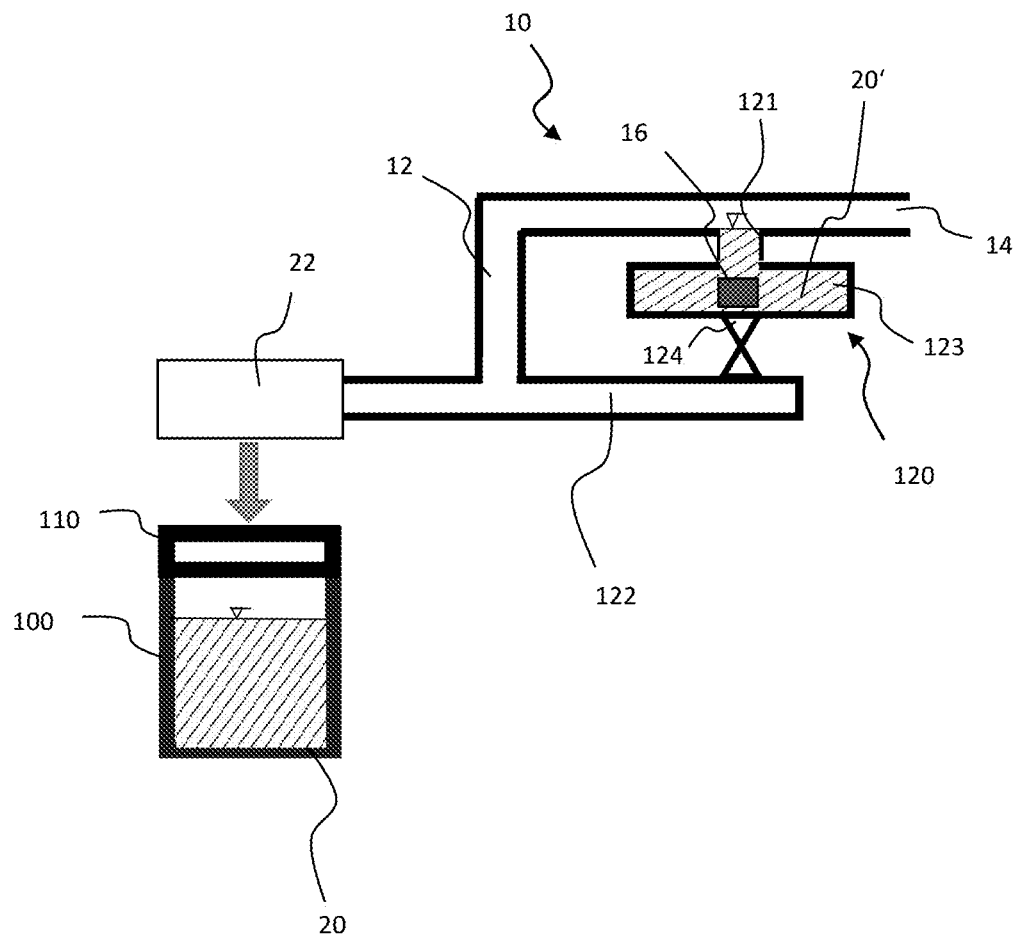
FIG. 4 schematically shows an onboard device for checking the quality of DEF according to a development of an embodiment.

FIG. 4 schematically shows an onboard device 10 for checking the quality of DEF 20 according to another development of an embodiment of the present disclosure. Where applicable, the explanations provided in the context of the embodiment shown in FIG. 3 above also apply to the development of the embodiment shown in FIG. 4.

Like the embodiments shown in FIGS. 1-3, the onboard device 10 for checking the quality of DEF 20 in a work machine comprises a flow channel 12 configured to fluidly connect a DEF inlet 14 with a DEF tank 100. The flow channel 12 comprises a DQS 16 configured to be brought into contact with DEF 20 passing through the flow channel 12. By that, both the amount of time the DQS 16 is submerged in DEF 20 and the local temperature can be reduced. Thereby, the likelihood of short-circuit failure of the DQS 16 is reduced.

The flow channel 12 may comprise a flow channel bypass 120, wherein the DQS 16 may be provided in the flow channel bypass 120. The flow channel bypass 120 may comprise a bypass reservoir 123, an upstream bypass section 121 and a downstream bypass section 122. The bypass may further comprise a bypass valve 124, wherein the bypass valve 124 may be provided downstream of the bypass reservoir 123. According to the development shown in FIG. 4, the DQS 16 may be provided upstream of the bypass valve 124.

To this end, the flow channel bypass 120 may be configured such that when DEF 20 is passing through the flow channel 12, during a filling event, an amount of DEF 20 accumulates in the bypass reservoir 123 as retained amount of DEF 20'.

Providing a bypass reservoir 123, a bypass valve 124 downstream of the bypass reservoir 123 and the DQS 16 on the inside of the bypass reservoir 123 has the advantage that the quality of the DEF 20 may be checked outside of the DEF tank 100 at a later point in time if the work machine is switched off during a filling event.

After the filling event, switching on the work machine will enable checking the quality of the retained amount 20' of the diesel fluid 20 inside of the bypass reservoir 123 by the DQS 16 provided on the inside of the bypass reservoir 123.

Subsequently, after checking the quality of the retained amount 20' of DEF 20 within the bypass reservoir 123, the bypass valve 124 downstream of the bypass reservoir 123 may be opened and the retained amount 20' DEF 20 will drain from the bypass reservoir 123 via the downstream bypass section 122 into the DEF tank 100.

During the time-span between filling in the DEF 20 and opening the bypass valve 124, the quality of the retained amount 20' of DEF 20 may be checked by the DQS 16. During all other times, the DQS 16 is not in contact with the DEF 20. By that, both the amount of time the DQS 16 is submerged in DEF 20 and the local temperature can be reduced. Thereby, the likelihood of short-circuit failure of the DQS 16 is reduced.

Due to the stagnant reservoir of retained fluid 20' formed in the bypass reservoir 123, the retained amount 20' of the diesel fluid 20 has a low degree of aeration, which can have a positive effect on the signal quality and accuracy of the output by the DQS 16. Thereby, the DEF quality check may be performed with higher accuracy.

Optionally, the onboard device 10 may comprise a pipe feed to tank device 22, via which DEF 20 may be drained from the flow channel 12 to the DEF tank 100. The bypass valve 124 may be a two-way valve having an inlet and an outlet port for on/off actuation. Preferably, the bypass valve 124 may be a solenoid valve actuated by a control unit of the work machine (not shown in FIG. 4). The DQS may be a time-of-flight sensor. Alternatively or additionally, any other senor technology for measuring the quality of DEF may be utilized.

Figure 5:
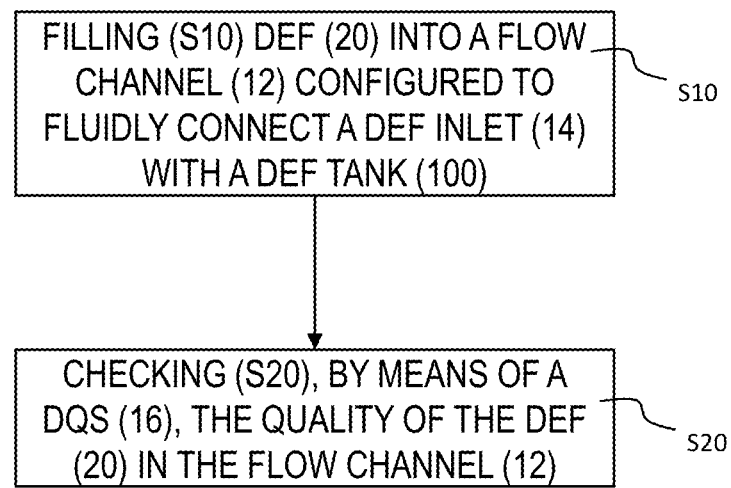
FIG. 5 schematically shows a method of checking the quality of DEF according to an embodiment.

FIG. 5 schematically shows a method of checking the quality of DEF 20 according to an embodiment. Accordingly, a method of checking the quality of DEF 20 may be provided, comprising the steps of filling S10 DEF 20 into a flow channel 12 configured to fluidly connect a DEF inlet 14 with a DEF tank 100 and by a step of checking S20, by means of a DQS 16, the quality of the DEF 20 in the flow channel 12.

The method according to this embodiment may be conducted by utilizing an onboard device 10 as disclosed in the embodiments of onboard devices 10 shown in FIGS. 1 and 2. To this end, the definitions, explanations and advantages provided in the context of the onboard devices 10 shown in FIGS. 1 and 2 may apply. However, it is not delimited thereto. The method may be restricted to onboard components of a work machine, meaning that the flow channel 12, the DEF inlet 14, the DQS 16, the DEF 20 to be checked and the DEF tank 100 may be onboard components and/or part of a work machine.

Figure 6:
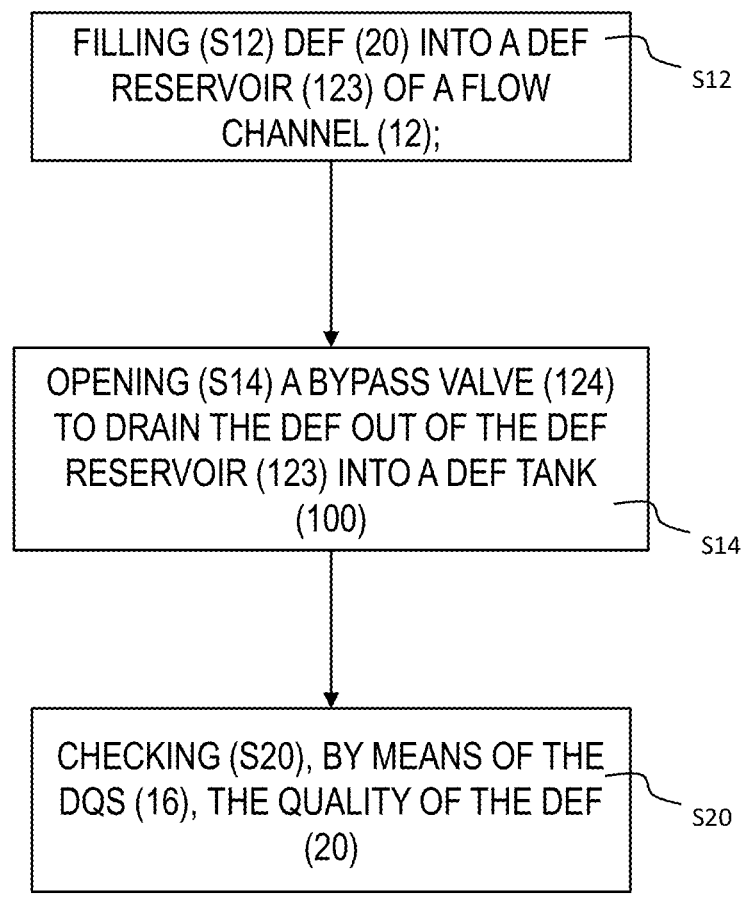
FIG. 6 schematically shows a method of checking the quality of DEF according to an embodiment.

FIG. 6 schematically shows a method of checking the quality of DEF 20 according to another embodiment. This embodiment may incorporate the features, definitions and explanations provided above in the context of the first embodiment of the method discussed in the context of FIG. 5. According to the embodiment shown in FIG. 6, the step of filling S10 DEF 20 into the flow channel 12 may comprise a step of filling S12 DEF 20 into a DEF reservoir 123 of the flow channel 12. Further, this embodiment of the method may comprise the step of opening S14 a bypass valve 124 to drain the DEF out of the DEF reservoir 123 into a DEF tank 100. This embodiment also includes the step of checking, S20, by means of a DQS 16, the quality of the DEF 20.

According to the embodiment shown in FIG. 6, the DQS 16 may be provided downstream of the bypass valve 124 and the step of checking S20 the quality of the DEF 20 is conducted after the step of opening S14 of the bypass valve 124.

The method according to this embodiment may be conducted by utilizing an onboard device 10 shown in FIG. 3. To this end, the definitions, explanations and advantages provided in the context of the onboard device 10 shown in FIG. 3 may apply. However, it is not delimited thereto. The method may be restricted to onboard components of a work machine, meaning that the flow channel 12, the DEF inlet 14, the DQS 16, the DEF 20 to be checked and the DEF tank 100 may be onboard components and/or part of a work machine. Further, the DEF reservoir 123 of the flow channel 12 and the bypass valve 124 to drain the DEF 20 may be onboard and/or part of a work machine.

Figure 7:
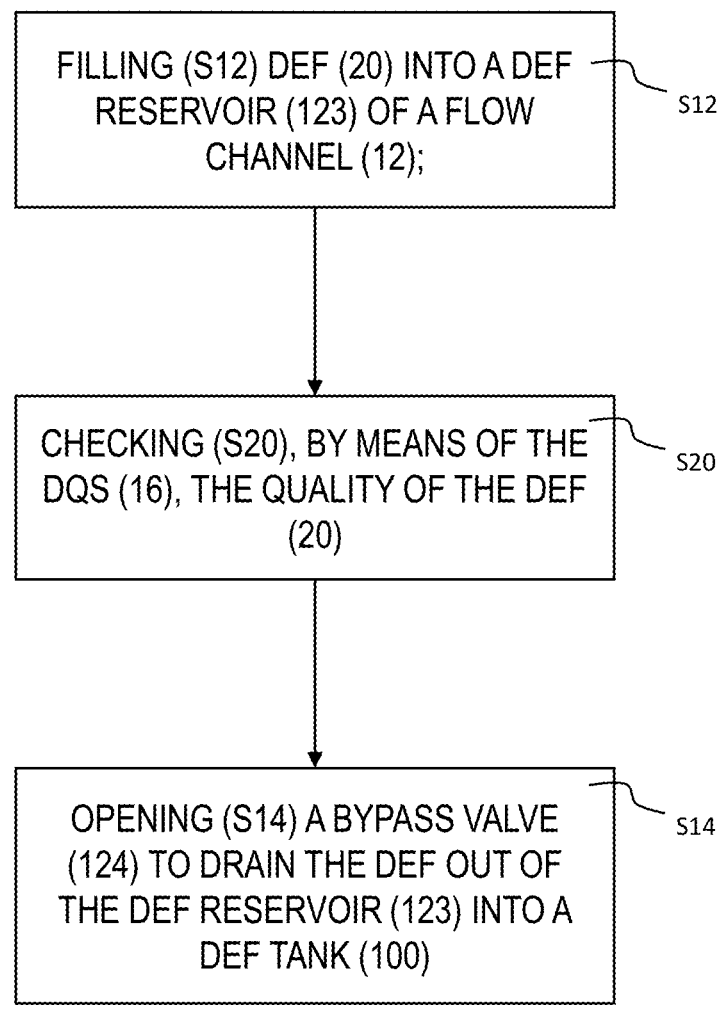
FIG. 7 schematically shows a method of checking the quality of DEF according to an embodiment.

FIG. 7 schematically shows a method of checking the quality of DEF 20 according to another embodiment. This embodiment may incorporate the features, definitions and explanations provided above in the context of the first embodiment of the method discussed in the context of FIG. 5. Accordingly, a method of checking the quality of DEF 20 may be provided, comprising the steps of filling S12 DEF 20 into a DEF reservoir 123 of a flow channel 12, opening S14 a bypass valve 124 to drain the DEF out of the DEF reservoir 123 into a DEF tank 100, and checking S20, by means of a DQS 16, the quality of the DEF 20.

According to the embodiment shown in FIG. 7, the DQS 16 may be provided inside of the DEF reservoir 123 and the step of checking S20 the quality of the DEF 20 is conducted before the step of opening S14 of the bypass valve 124.

The method according to this embodiment may be conducted by utilizing an onboard device 10 shown in FIG. 4. To this end, the definitions, explanations and advantages provided in the context of the onboard device 10 shown in FIG. 4 may apply. However, it is not delimited thereto. The method may be restricted to onboard components of a work machine, meaning that the flow channel 12, the DEF inlet 14, the DQS 16, the DEF 20 to be checked and the DEF tank 100 may be onboard components and/or part of a work machine. Further, the DEF reservoir 123 of the flow channel 12 and the bypass valve 124 to drain the DEF 20 may be onboard and/or part of a work machine.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and all features mentioned before in any technically feasible combination. As an example, an onboard device may be configured such that An onboard device for checking the quality of DEF in a work machine may be provided, comprising a flow channel configured to fluidly connect a DEF inlet with a DEF tank. The flow channel may comprise a DQS configured to be brought into contact with DEF passing through the flow channel.

Thereby, both the amount of time the DQS is submerged in DEF and the local temperature can be reduced. Thereby, the likelihood of short-circuit failure of the DQS is reduced.

Mounting the DQS may be conducted such that it is a part of the flow channel flow circuit instead of being submerged at the bottom of a DEF tank. The flow channel may be configured for gravity feed.

In a further development, the flow channel may comprise a U-shaped section configured to retain an amount of exhaust fluid passing through the flow channel, wherein the DQS may be configured such that it is submerged in the retained DEF amount in a case when retained DEF amount is present. Because the retained amount of DEF present in the U-shaped section is smaller than the total amount DEF, ammonia formation may be lower in the retained amount of the DEF. As a result, the concentration gradient may be smaller and, following Fick's law of diffusion, the permeation into the DQS. Thereby, the likelihood of short-circuit failure of the DQS is reduced.

Further, the U-shaped section and the DQS may be placed at a location in the work machine where, during operation of the work machine, the local temperature is lower than a median temperature of the DEF tank assuming normal operation of the work machine and standard atmosphere ambient weather conditions. Thereby, the likelihood of short-circuit failure of the DQS is reduced.

According to a further embodiment, the flow channel may comprise a flow channel bypass, wherein the DQS may be provided in the flow channel bypass. Providing a flow channel bypass has the advantage that DEF filled into the inlet of the flow channel may be deviated away from the DEF tank for quality checking purposes. Thereby, the DQS may be provided outside of the DEF tank.

Further, providing a flow channel bypass has the advantage that DEF may be guided for quality checking purposes to a location inside the work machine having lower temperatures than the DEF tank, assuming a nominal operation of the work machine for standard atmosphere ambient weather conditions.

By that, both the amount of time the DQS is submerged in DEF and the local temperature can be reduced. Thereby, the likelihood of short-circuit failure of the DQS is reduced.

According to a preferred development, the flow channel bypass may comprise a bypass reservoir. Providing a bypass reservoir in the flow channel bypass has the advantage that DEF filled into the inlet of the flow channel may be stored at a distance from the DEF tank for quality checking purposes. Thereby, the DQS may be provided outside of the DEF tank.

Further, providing a bypass reservoir in the flow channel bypass has the advantage that DEF may be stored for quality checking purposes to a location inside the work machine having lower temperatures than the DEF tank, assuming a nominal operation of the work machine for standard atmosphere ambient weather conditions.

By that, both the amount of time the DQS is submerged in DEF and the local temperature can be reduced. Thereby, the likelihood of short-circuit failure of the DQS is reduced.

In a further development, the flow channel bypass may comprise a bypass reservoir, an upstream bypass section and a downstream bypass section. Thereby, the bypass reservoir may be positioned at any position along the length of the flow channel bypass. Thereby, the bypass reservoir may be provided at a location having a desired expected temperature range.

In a further development, the bypass may comprise a bypass valve. By providing a valve, DEF may be retained in and drained from the bypass reservoir. Thereby, the retained amount of DEF may be displaced during operation of the work machine.

According to an embodiment, the bypass may comprise a bypass reservoir in a bypass valve downstream of the bypass reservoir, wherein the bypass valve is standard-off. Thereby, the amount of DEF flowing through the bypass may be retained in the bypass reservoir when the work machine is switched off. Further, the retained amount of DEF may be drained conveniently from the bypass reservoir when the work machine is switched on.

Preferably, the bypass valve may be a two-way valve. Further, the bypass valve may be a solenoid valve. Thereby, a readily available, cost-effective and reliable bypass valve may be implemented into the bypass.

In a further development, the DQS may be provided downstream of the bypass valve. Thereby, the quality of the DEF may be checked outside of the DEF tank at a later point in time if the work machine is switched off during a filling event.

After the filling event, switching on the work machine will enable releasing the bypass valve downstream of the bypass reservoir and will drain the retained amount of DEF over the DQS downstream of the bypass reservoir. During that time-span, the quality of the retained amount of DEF may be checked by the DQS. During all other times, the DQS is not in contact with the DEF.

By that, both the amount of time the DQS is submerged in DEF and the local temperature can be reduced. Thereby, the likelihood of short-circuit failure of the DQS is reduced.

In an alternative development, the DQS may be provided inside of the bypass valve in the bypass reservoir. Thereby, the quality of the DEF may be checked outside of the DEF tank at a later point in time if the work machine is switched off during a filling event, for example at a point in time when the work machine is switched on.

After the filling event, switching on the work machine will enable checking the quality of the retained amount of the diesel fluid inside of the bypass reservoir by the DQS provided on the inside of the bypass reservoir.

Subsequently, after checking the quality of the retained amount of DEF within the bypass reservoir, the bypass valve downstream of the bypass reservoir may be opened and the retained amount DEF will drain from the bypass reservoir via the downstream bypass section into the DEF tank.

During the time-span between filling in the DEF and opening the bypass valve, the quality of the retained amount of DEF may be checked by the DQS. During all other times, the DQS is not in contact with the DEF. By that, both the amount of time the DQS is submerged in DEF and the local temperature can be reduced. Thereby, the likelihood of short-circuit failure of the DQS is reduced.

According to a further embodiment, the DQS may be a time-of-flight sensor. Thereby, a compact construction, easy-of-use, together with high accuracy and high frame rate optical sensor device may be utilized, providing a reliable quality check of fluid filled into the flow channel via the flow channel inlet.

In a preferred development, the flow channel my further comprise a heating device. Typically, freezing of diesel engine fluid shall occur only in the diesel engine fluid tank. In the case when DEF is contained in the flow channel in a frozen state, the heating device enables thawing of DEF in a timely fashion as to allow a DQS reading to be taken.

A method of checking the quality of DEF may be provided, comprising the steps of filling DEF into a flow channel configured to fluidly connect a DEF inlet with a DEF tank and by a step of checking, by means of a DQS, the quality of the DEF in the flow channel.

By that, both the amount of time the DQS is submerged in DEF and the local temperature can be reduced. Thereby, the likelihood of short-circuit failure of the DQS is reduced.

Checking the quality of the DEF in the flow channel may be understood as conducting a measurement of DEF via the DEF sensor inside the flow channel.

According to an embodiment, the step of filling DEF into the flow channel may comprise a step of filling DEF into a DEF reservoir of the flow channel, further comprising the step of opening a bypass valve to drain the DEF out of the exhaust fluid reservoir into a DEF tank. This embodiment also includes the step of checking, by means of the DQS, the quality of the DEF. By that, both the amount of time the DQS is submerged in DEF and the local temperature can be reduced. Thereby, the likelihood of short-circuit failure of the DQS is reduced. The step of filling DEF into a DEF reservoir of the flow channel may be understood as sub-step of the step of filling DEF into the flow channel. Usually, if a DEF reservoir is present in the flow channel, filling DEF into the flow channel may also include filling in DEF into the DEF reservoir.

According to an embodiment, the DQS may be provided downstream of the bypass valve, wherein the step of checking the quality of the DEF may be conducted after the step of opening the bypass valve. By that, both the amount of time the DQS is submerged in DEF and the local temperature can be reduced. Thereby, the likelihood of short-circuit failure of the DQS is reduced.

According to an alternative embodiment, the DQS may be provided inside of the DEF reservoir and wherein the step of checking the quality of the DEF may be conducted before the step of opening the bypass valve. By that, both the amount of time the DQS is submerged in DEF and the local temperature can be reduced. Thereby, the likelihood of short-circuit failure of the DQS is reduced.

INDUSTRIAL APPLICABILITY

With reference to the Figures, an onboard device for checking the quality of DEF in a work machine and a method of checking the quality of DEF are applicable in any work machine powered by a diesel engine or comprising a diesel engine, in particular hybrid work machines.

In practice, an onboard device for checking the quality of DEF in a work machine may be manufactured, bought, or sold to retrofit a diesel engine powered work machine, or a hybrid work machine comprising a diesel engine, already deployed in the field in an aftermarket context, or alternatively may be manufactured, bought, sold or otherwise obtained in an OEM (original equipment manufacturer) context.

As alluded to previously herein, the aforementioned embodiments may increase the reliability and performance as will be elaborated further herein momentarily.

Referring to FIG. 1, there is an embodiment showing an onboard device for checking the quality of DEF in a work machine provided, comprising a flow channel configured to fluidly connect a DEF inlet with a DEF tank. The flow channel may comprise a DQS configured to be brought into contact with DEF passing through the flow channel.

One skilled in the art will expect that various embodiments of the present disclosure will provide an onboard device providing a reliable yet simple, cost-effective onboard device for checking the quality of DEF.

One skilled in the art will expect that various embodiments of the present disclosure will have an improved simplicity, more cost-effective and reliable method of checking the quality of DEF.

The present description is for illustrative purposes only and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," "include", "includes", "including", or the like are intended to be open-ended terms. Further, the phrase "based on" is intended to mean "based, at least in part, on" unless explicitly stated otherwise. Further, coordinate axes are intended to be exemplary only without delimiting the scope of the disclosure.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of values or dimensions herein are merely intended to serve as a shorthand method of referring individually to each separate value falling within the range, unless otherwise indicated herein, and each separate value is incorporated into the specification as if it were individually recited herein.

Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An onboard device for checking the quality of diesel exhaust fluid (DEF) in a work machine, the onboard device comprising a flow channel configured to fluidly connect a DEF inlet with a DEF tank, characterized in that the flow channel comprises:
    a DEF quality sensor (DQS) configured to be brought into contact with DEF passing through the flow channel; and
    a flow channel bypass comprising a bypass valve and a bypass reservoir, the bypass valve being connected downstream of the bypass reservoir, relative to a direction of flow of the DEF, wherein the DQS is provided in the flow channel bypass, wherein the bypass valve is a standard-off valve.

2. The onboard device according to claim 1, wherein the flow channel bypass comprises an upstream bypass section and a downstream bypass section.

3. The onboard device according to claim 1, wherein the DQS is provided downstream of the bypass valve.

4. The onboard device according to claim 1, wherein the DQS is provided inside of the bypass reservoir and upstream of the bypass valve.

5. The onboard device according to claim 1, wherein the DQS is a time-of-flight sensor.

6. The onboard device according to claim 1, wherein the flow channel further comprises a heating device.

7. The onboard device according to claim 1, further comprising a sensor overflow reservoir downstream of the bypass valve, wherein the DQS is provided in the sensor overflow reservoir.

8. The onboard device according to claim 1, wherein the DQS is connected upstream of the bypass valve.

9. A method of checking the quality of diesel exhaust fluid (DEF) using an onboard device of a work machine, the method comprising:
    receiving DEF with a flow channel of the onboard device, the flow channel being configured to fluidly connect a DEF inlet of the onboard device with a DEF tank of the work machine and the flow channel having a flow channel bypass and a bypass valve provided in the flow channel bypass, including filling the flow channel bypass with a portion of the DEF, as retained DEF;
    checking, using a DEF quality sensor (DQS) provided in the flow channel bypass, a quality of the retained DEF in the flow channel bypass; and
    opening the bypass valve to drain the retained DEF from the flow channel bypass into the DEF tank,
    wherein the DQS is provided downstream of the bypass valve, relative to a direction of flow of the DEF, and wherein the checking the quality of the retained DEF is performed after the step of opening the bypass valve.

10. The method of claim 9, wherein the DQS is provided inside of a DEF reservoir provided in the flow channel bypass, and wherein the checking the quality of the retained DEF is performed before the step of opening the bypass valve.

11. The method of claim 9, wherein the checking the quality of the retained DEF is performed after a key-on event for the work machine.

12. The method of claim 9, wherein the bypass valve is a standard-off type valve, and wherein the checking the quality of the retained DEF and opening the bypass valve are performed after a key-on event for the work machine.

13. The method of claim 9, wherein the flow channel bypass comprises an upstream bypass section and a downstream bypass section.

14. The method of claim 9, wherein the DQS is a time-of-flight sensor.

15. The method of claim 9, wherein the flow channel further comprises a heating device.

16. The method of claim 9, wherein the onboard device further includes a sensor overflow reservoir downstream of the bypass valve, wherein the DQS is provided in the sensor overflow reservoir.

* * * * *